U̇nited States Patent Office 2,897,428
Patented July 28, 1959

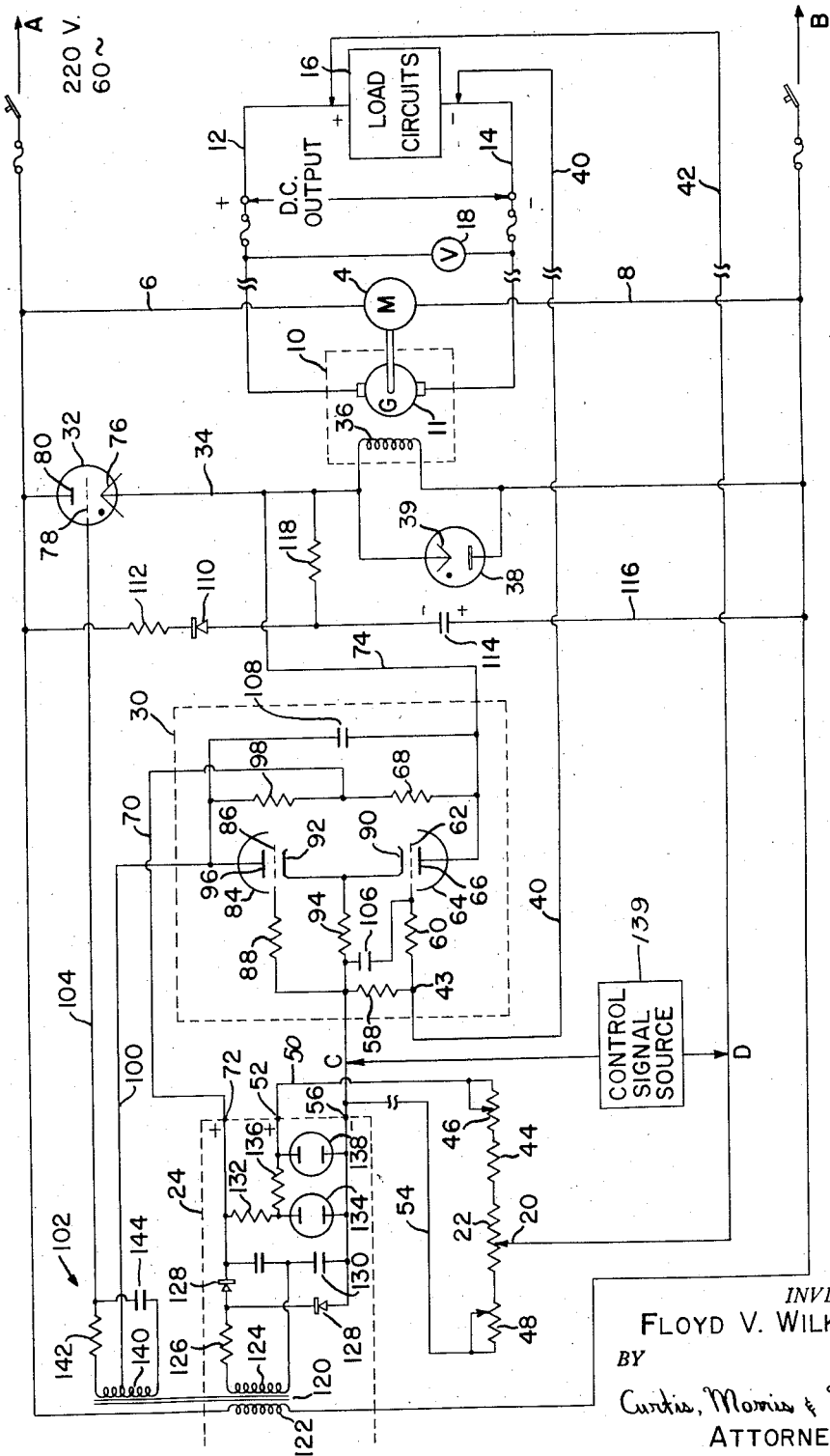

2,897,428

MOTOR-GENERATOR POWER SUPPLY SYSTEMS

Floyd V. Wilkins, Packanack Lake, N.J.

Application December 2, 1955, Serial No. 550,687

11 Claims. (Cl. 322—36)

The present invention is in the field of electronically controlled motor-generator power supplies for supplying direct current with a well regulated voltage, and relates particularly to motor-generator power supply systems in which the output voltage is accurately controlled and can be continuously adjusted over a relatively wide range of values.

It is among the objects of the present invention to provide improved motor-generator power supply systems of reduced complexity and capable of delivering well regulated output voltages continuously adjustable as desired over wide ranges, which are easy to operate, and have other desirable characteristics making them well suited for use in a wide variety of applications.

Among the many advantages of the motor-generator power supply system described herein as embodying the present invention are those resulting from its quick sensitive response to changes in conditions in the output circuit so that quick compensations are made for sudden changes in the load. That is, the time-constant of the system is very short, and thus the output voltage is held substantially constant at its adjusted value without any significant fluctuations or changes due to sudden changes in load. Moreover, the power supply system described has good over-all regulation, with the output voltage being held constant at its adjusted value regardless of fluctuations in the voltage on the alternating current power mains which are used to energize the motor and field winding of the generator.

In the motor-generator power supply system described herein the load voltage is held constant to within one-third of one percent for all conditions of load, that is, in spite of changes from no load up to full load, and regardless of fluctuations of the voltage in the alternating current power mains even as much as 20% above and below the proper value. Thus, a person using a motor-generator system as described herein is enabled to set the control to a predetermined reading and is assured that the voltage actually delivered to the load circuit is held very closely to the reading as set at the control.

A further advantage of the power supply system described herein is that it provides a continuous adjustment over a relatively wide range. That is, for example, with the system described herein as illustrative of the present invention the operator can adjust the output voltage to any desired integral or fractional value from 4 volts up to 35 volts. This adjustment is readily made by changing the setting of a potentiometer.

The output voltage can be adjusted down even to voltages below those which normally could be obtained from the same generator because of the residual magnetism in the field structure of the generator. In the apparatus as described, this residual field magnetism is reduced by a small continuous reverse bucking voltage which is supplied from a residual field bucking circuit and is fed to the generator field winding. The bucking voltage has no effect when the output voltage is set to the higher values, but when the output voltage is set to the lower values, it causes partial neutralization of the residual magnetism and enables these low values to be obtained and to be accurately controlled.

Among the further advantages in action of this bucking voltage arrangement is that at such low output voltages it enables a more positive control action over the output voltage, for it assures that the thyratron which is used to energize the generator field winding is placed in conduction every cycle. In effect, this field energizing thyratron is maintained in active operation even for low output voltages, and so precise control of the output voltage is obtained. Thus, advantageously this thyratron is always in "active stand by condition" ready instantaneously to conduct any increased current through the field winding as required. This stand by condition advantageously avoids any time delay for the gas to be raised up to the ionizing threshhold voltage before the increased demand can be met. This active condition of the generator field thyratron is particularly desirable for maintaining constant output voltage in conditions where sudden increases in the load are encountered starting from a no-load condition.

The favorable low time constant and highly effective "stand by" condition of the motor-generator direct voltage supply system described herein, whereby changes in the load condition are almost instantaneously reflected in accurate compensating changes in the output circuits which maintain the load voltage at the desired value is strikingly demonstrated by throwing a switch, so as to connect and disconunect a full rated load on the generator. In going instantaneously from the no load to the full load condition and then back again, any brief fluctuation in the output voltage is very insignificant and lasts less than 0.08 second.

Another advantage of the motor-generator system described is the fact that it enables the remote sensing of the voltage actually being delivered to the load itself. Thus, the motor-generator system may be located at a substantial distance from the load and maintain the desired accurately controlled voltage at the load. For example, the motor-generator set may be placed in the basement while the load circuit, such as a testing bench is located on some upper floor in the building with remote sensing leads being used to measure the direct voltage actually being delivered to the load circuits and running back to operate the control circuits of the motor-generator set so as to deliver the desired voltage to the load circuits.

Years ago motor-generator sets were rather commonly used for the purpose of supplying direct voltage for testing purposes and in electrical shops for making various measurements. However, these original motor-generator sets had certain disadvantages which have led to the adoption of rectifier type supplies for many of these uses. The present invention provides many features and advantages which I believe will enable motor-generator sets commercially to supplant rectifier supplies in many places. The motor-generator system described herein has improved operating characteristics which are better than those of commercially available rectifier supplies of much greater cost and complexity.

These rectifier type power supplies have an inherently low frequency ripple voltage requiring a large degree of filtering in the output circuit in order to provide the necessary smooth direct output voltage. The result is that the time constants of these rectifier type voltage supplies are relatively long; so that changes in the load condition cause serious fluctuations in the load voltage before compensation can be achieved. The output voltage from the motor generator system described herein is more smooth than the output from a rectifier. Any slight ripple voltage which appears due to commutator action is of very small amplitude and of relatively high frequency, and is usually found to be not at all significant. Moreover, if necessary, any ripple is very readily removed by a small amount of filtering, whereas the rectifier type supplies require extensive filter circuits resulting in bulk and weight, expense and sluggish response to changes.

In the specification and the accompanying drawing as described and shown a motor-generator power supply system embodying my invention and various modifications thereof are suggested, but it is to be understood that this disclosure is not intended to be exhaustive nor limiting of the invention, but, on the contrary is given for purposes of illustration in order that others skilled in the art may fully understand the present invention and ways of applying the motor-generator supply system in practical use and so that they may modify and adapt such motor-generator supply systems in various forms, each as may be best suited to the conditions of a particular use.

The various objects, aspects, and advantages of the present invention will be more fully understood from a consideration of the following specification in conjunction with the accompanying drawing, which is a schematic circuit diagram illustrating an electronically controlled motor-generator direct voltage power supply circuit embodying the present invention.

Referring generally to the system shown in the figure, it includes a motor 4 which is energized over a pair of leads 6 and 8 from a pair of alternating current (A.C.) power mains A and B carrying suitable current, for example, conventional 220 volt 60 cycle A.C. The motor 4 drives a generator, indicated within the broken line 10, whose armature 11 supplies a readily controllable, well regulated direct current (D.C.) over a pair of leads 12 and 14 to load circuits 16. The magnitude of the D.C. output voltage is indicated by a meter 18 and is accurately controlled in accordance with the setting of a movable control contact 20 along a control potentiometer 22. This potentiometer is energized with direct voltage from a power supply 24 indicated within the broken line 24 and can be located at any convenient point either near the load circuits or near the generator. An amplifier 30, described in detail later, serves to amplify any slight difference between the voltage established at the contact 20 and the voltage actually appearing between the leads 12 and 14 at the load. The amplified signal is used to control the conduction of controllable unidirectional conduction means 32, shown in the form of a thyratron rectifier, which is connected by a lead 34 in series with the field winding 36 of the generator 10 between the A.C. lines A and B. In this way the energization of the generator field winding is controlled to accurately control the output voltage in accordance with the setting of the contact 20.

The generator field winding 36 is energized during alternate half cycles from the A.C. power mains A and B through the thyratron rectifier 32, and an inverse rectifier 38, shown as a gas tube, is connected from the lead 34 across the field winding with a direction of conduction inverted with respect to the thyratron 32. The purpose of this inverse rectifier is to maintain current flowing through the field winding 36 during those half cycles of the alternating current when the controllable thyratron 32 is not in conduction. This inverse rectifier allows the field current to continue by circulating in a loop down through the field winding and back up through the inverse rectifier. This is a low resistance loop and the current is maintained by the inductive effect of the field winding.

The output lines 12 and 14 to the load circuits 16 may include suitable fuses, as shown. As indicated by the breaks shown in these lines between the armature 11 and the meter 18, it will be understood that the meter and fuses may desirably be located in the vicinity of the load circuits so that the operator can conveniently keep a close check on the load circuit and change the fuses if needed. The motor-generator set 4 and 10 and the power supply 24 and amplifier 30 may be located remotely from the load circuits at some convenient point, for example, such as a location near the electric meter panel for the building. However, a motor-generator supply system as described herein is relatively compact and quiet in operation and can readily be mounted upon a small wheeled cart and moved around from bench to bench in a laboratory or in a testing shop as required.

This system provides great flexibility in use and accuracy of control and is well suited both for permanent installations of the remote type and for use as a mobile power supply for many test purposes. In addition, the voltage output is so constant and well regulated and the apparatus itself is relatively so inexpensive compared with rectifier type supplies of equivalent power output, that the system can often be used to advantage as a temporary or permanent D.C. power supply where a predetermined relatively low voltage and large output current is required.

In order to sense the voltage actually being delivered over the leads 12 and 14 to the load circuits and to feed this information back to the control circuits, a pair of remote sensing leads 40 and 42 are used. The lead 40 is connected from the negative output lead 14 to an input terminal 43 of the amplifier 30, while the lead 42 is connected from the positive lead 12 to the contact 20.

The control potentiometer 22 is connected in series with a range limiting resistor 44, and a pair of adjustable resistors 46 and 48 are also in series at either side for setting the desired width of the control range. This series control combination is supplied with a well regulated voltage through a lead 50 from a terminal 52 of the power supply 24, with the opposite side of the control being returned through a lead 54 to a common return connection 56 on the power supply 24 (herein called the "ground" connection). Thus, the right end of the control potentiometer 22 is held at a more positive voltage than its left end, and the load voltage is connected over the leads 40 and 42 in opposition to the potentiometer voltage. This system operates to advantage over the full range from 4 volts up to 35 volts, and the resistors 44, 46 and 48 are chosen and set to give this value.

In operation, the contact 20 is moved along this potentiometer to a point having a voltage corresponding with the desired output voltage at the load circuit. Any voltage difference which may exist between the setting of the contact 20 and the voltage as read at the meter 18 is fed back over the remote sensing lead 40 to the input terminal 43 of the amplifier 30. This difference voltage is fed across an amplifier input resistor 58 having its other end grounded and is fed through a grid isolation resistor 60 to the grid 62 of a triode 64. The plate 66 of this triode is connected through a plate load resistor 68 and a plate voltage supply lead 70 to a positive supply terminal 72 of the power supply. The amplified signal appearing at the plate 66 is coupled through a lead 74 to the cathode 76 of the controllable thyratron 32.

Assuming that the load voltage is slightly below the voltage corresponding to the setting of the contact 20, then the amplifier input terminal 43 is driven in a positive direction, increasing the current through the plate resistor 68 and hence lowering the voltage of the anode 66. This reduces the voltage of the cathode 76 relative to the grid 78 of the thyratron 32, or in other words, raises the grid voltage and hence causes the thyratron 32 to begin conduction, that is "fire" at an earlier point during the half cycle of the voltage on the alternating current mains when the anode 80 of the thyratron 32 becomes positive with respect to the cathode 76. The earlier firing of the thyratron 32 increases the current through the field winding 36, raising the magnetic strength of the field and correspondingly raising the output voltage to the desired value.

The amplifier 30 is similar to an amplifier described in detail and claimed in my copending application Serial No. 499,599, filed April 6, 1955. In order to enable discrimination against amplification of any ripple component in the voltage on the lead 40 which may appear due to commutation action, another triode 84 is arranged in the amplifier 30 so that its output effectively cancels the amplified output from the tube 64 for rapid fluctuations in the voltage on the lead 40. Their amplification for slower fluctuations is effectively additive. Moreover, these two triodes act substantially to balance out any tendency toward amplification changes due to line voltage changes or tube aging characteristics. The grid 86 of the triode 84 is connected through a grid return resistor 88 to the common connection 56, and the cathodes 90 and 92, respectively, are tied together and connected through a common cathode resistor 94 to the ground connection 56. Thus, the triode 84 produces an amplified signal at the junction of its anode 96 and its anode load resistor 98 which is exactly out-of-phase with respect to the amplified signal on the lead 74 to the cathode. The amplified signal at the anode 96 is fed by a lead 100 to a grid bias and phase shift network, generally indicated at 102 and explained in detail later, and then over a lead 104 to the grid 78.

Thus, if the voltage at the load is slightly below that which is set at the contact 20, the amplifier 30 amplifies this difference and causes the grid 78 to become more positive with respect to the cathode 76 so as to increase the proportionate conduction time of the thyratron 32 and thus increase the generator field energization and hence the output voltage to the desired value.

If the load is suddenly reduced, causing a tendency for the load voltage to rise, any slight difference between the actual load voltage and that which is called for by the setting of the contact 20 appears as a slight reduction in the voltage which is fed over the lead 40 to the input terminal 43. This slight reduction in voltage is amplified and reduces the proportionate firing time of the thyratron 32 to reduce the output voltage back to its desired value.

To provide further discrimination against any amplification of ripple voltage, a capacitor 106 is connected between the grid 62 and ground so as to reduce the input impedance and gain for higher frequency components. And a capacitor 108 between the anodes 66 and 96 acts to cancel out any higher frequency components which may appear at these anodes. This makes the operation of the thyratron 32 more stable by assuring that it is fired at the proper point in each half cycle as required by changes in load conditions and not as a result of any other factors. At the same time, the capacitors 106 and 108 allow the desired lower frequency components of the voltage appearing on the remote sensing lead 40 to be amplified and used to control the thyratron 32. The effective action of these control circuits is shown by the fact that a sudden change in load conditions, such as from no load to full load, or vice versa, is compensated for and any disturbance in the output voltage disappears within less than 0.08 second.

In order to enable the output voltage to be adjusted down to values which are below those normally obtainable from the generator 10 because of residual field magnetism, a residual field bucking circuit is used. This field bucking circuit includes a rectifier 110 in series with a current limiting resistor 112 connected to the A.C. main A. This rectifier is used to maintain a continuous charge on a capacitor 114 which is connected by a lead 116 to the other A.C. line B. The charge on the capacitor 114 is such that its upper terminal, as shown, is negative with respect to the lead 116, and an isolating resistor 118 applies this capacitor voltage to the generator field winding 36.

The polarity of this capacitor voltage is such that it continuously urges a trickle of current through the winding 36 in opposition to that which normally flows from the controllable thyratron 32 so as to buck against the residual field magnetism and reduce it. At higher output voltages, for example above about 6 or 7 volts, the residual field bucking circuit has no significant effect upon the action of the generator, for the large conduction through the thyratron 32 completely overrides any voltage on the capacitor 114. However, at lower output voltages, for example, below about 6 or 7 volts, depending upon the residual field magnetism characteristics of the particular generator being used, the controllable thyratron 32 no longer fully dominates the action of the circuit because the output voltage is generated mainly as a result of the residual field magnetism.

At these lower output voltages, the reverse flow of current through the field winding 36 from the condenser 114 partially neutralizes the residual field flux. This enables the lower output voltages to be obtained and to be controlled accurately, for example, this circuit operates highly satisfactory down to lower output values such as 4 volts.

Other beneficial results also flow from the use of this residual flux bucking circuit. Because its action tends to reduce the residual flux to zero, it correspondingly tends to reduce the output voltage down to zero, that is, below the value set by the contact 20. As a consequence, the thyratron 32 is caused to continue firing for a brief period during each cycle so as to maintain the output voltage at the established value. This has the advantage that positive and accurate control is obtained over these low output voltages, because the thyratron 32 is forced to fire every cycle. Thus, if the residual field flux characteristics of the generator 10 should change, say, as a result of temperature change of the field structure, nevertheless the output voltage remains accurately controlled to within ⅓ of 1%. In effect the thyratron 32 is always maintained in an active condition ready to meet any increased demand.

The reverse bucking voltage from the condenser 114 which is applied across the field winding is less than that which ionizes the gas in the inverse rectifier.

The power supply 24 includes a transformer 120 having its primary winding 122 energized from the lines A and B and having its secondary 124 connected through a current limiting resistor 126 to a voltage doubling circuit including a pair of rectifiers 128 and a pair of condensers 130 which supply a relatively high direct output voltage to the terminal 72.

A lower, very well regulated positive voltage is supplied to the terminal 52 by means of a voltage regulation circuit utilizing a filter resistor 132 and a first voltage regulator tube 134 with a second filter resistor 136 and a second voltage regulator tube 138 being connected across the first tube. This dual arrangement of voltage regulator tubes is disclosed and claimed in my above-identified copending application. The voltage which is supplied to the second tube is regulated by the first tube. This arrangement provides a very well regulated source of reference voltage substantially independent of fluctuations in the voltage on the lines A and B. However, other stable sources of reference voltage, such as batteries may be used to provide a suitable voltage between the terminals 52 and 56.

Other important advantages of this power supply system are brought out by the following analysis. In operation, in effect the circuit 24 and the control potentiometer circuit operate as a control signal source to create a control signal voltage which is applied at the points C and D between the common ground return 56 and the remote sensing lead 42. The motor-generator system then acts to produce an output voltage on the leads 12 and 14 at the load which is exactly the same as the voltage applied between the points C and D by the control signal source. Schematically shown by the block 139 is another control signal source, which illustrates any other suitable control signal source which may be used in lieu of the control signal source as shown, in order to control the output voltage, as will be understood by those skilled in the art.

Although the output voltage is the same as the control signal voltage, it advantageously represents a tremendous effective gain in power. For example, the maximum power input occurs when the control signal input is adjusted to 35 volts and the motor has just been started. During this instant the full 35 volts is effectively applied across the input resistor 58, which has a resistance of about one-half a megohm. Thus, the maximum input power is about 70 micro-watts. An instant later, when the output voltage has risen to its full value the amount of power input from the control signal source becomes effectively zero. However, at full rated output of 35 volts the output current is 20 amperes, representing a power output of 700 watts. When seen from this point of view it is realized that this system advantageously provides a controlled power gain of about ten million times. And nevertheless the output voltage very accurately follows the voltage from the control signal source, whatever this source may be. This motor-generator power supply arrangement is well adapted for control from a wide variety of control signal sources as will be understood by those skilled in the art.

The thyratron grid bias and phase shift network 102 makes the control action of the thyratron 32 more stable and enables it to be fired at any point in the half cycle during which the anode 80 is positive. The lead 100 is connected to a center tap on a low voltage secondary 140 across which is connected a resistor 142 in series with a condenser 144 with their junction connected to the lead 104.

It will be understood by those skilled in the art that the cathodes 39 and 76 of the tubes 38 and 32, respectively, are heated by low voltage A.C. supplied from suitable secondary windings on the transformer 120, which are omitted from the drawing to make it more clear. The A.C. lines A and B contain suitable switches and fuses as shown.

In a circuit as shown the following values for certain of the components as listed below show themselves to be highly satisfactory:

| Reference numeral: | Value or type |
|---|---|
| 4 | 1 H.P. motor, 220 v. rating. |
| 10 | Described below. |
| 20 | 50K ohms, helical. |
| 32 | C1B, Electronics, Inc., Newark, N.J. |
| 38 | NL-649, National Electronics, Inc., Geneva, Ill. |
| 44 | 50K ohms. |
| 46 | 50K ohms, wire wound. |
| 48 | 10K ohms, wire wound. |
| 110 | 20Y2, rectifier. |
| 112 | 150 ohms. |
| 118 | 27K ohms. | where K=1,000.

The generator is rated to supply up to 20 amperes at 40 volts. The generator should be rated to produce a few volts more than the maximum desired controlled output voltage. This is to accommodate any voltage drop which may occur in the lines 12 and 14 to the load circuits. Thus, a full output voltage of 35 volts is assured in all installations.

As used herein the terms "controllable unidirectional current means" and variations of it, are intended to include sources of unidirectional current, both intermittent and steady, from which the amount of power transmitted can be controlled.

From the foregoing it will be understood that the motor-generator power supply system described above and the modifications thereof indicated, are well suited to provide the many advantages set forth, and since many possible embodiments of the various features of this invention may be made without departing from the scope of the present invention, it is to be understood that all matter hereinbefore set forth or shown in the accompanying drawing is to be interpreted as illustrative and not in a limiting sense, and that in certain instances some of the features of the invention may be used without a corresponding use of other features, or without departing from the scope of the invention.

What is claimed is:

1. Motor-generator supply apparatus adapted to provide direct current and to control the voltage of said direct current over a range comprising a motor adapted to be energized from an electrical power source, a generator having separate field and armature windings, output connections secured to said armature, said armature being driven by said motor, controllable unidirectional current means connected to the field winding of the generator, a control circuit connected to the output connections from the armature and connected to said controllable unidirectional current means to control the energization of the field winding, said control circuit being adjustable to change the energization of the field winding for changing the voltage between said output connections, and a residual field bucking circuit for reducing the residual magnetism of the generator field structure at low output voltages connected to said field winding and continuously urging current through said field winding in the opposite direction from that of the current from said controllable unidirectional current means, said residual field bucking circuit including a source of direct current and circuit means connecting said source of direct current across said field winding with a polarity that is continuously opposed to the polarity which is developed across said field winding by the current from said controllable unidirectional current means.

2. Motor-generator supply apparatus adapted to supply direct current to output connections and to control the voltage of said direct current over a range comprising a motor adapted to be energized from an electrical power source, a generator having separate field and aramture windings, output connections secured to said armature, said armature being driven by said motor, controllable unidirectional current means connected to the field winding of the generator, an amplifier, a source of unidirectional reference voltage, sensing leads coupling the voltage on said armature output connections in opposition to the voltage of said source, with the difference being supplied to said amplifier, the output of said amplifier being connected to said controllable unidirectional means to control the energization of the field winding, and a residual field bucking circuit connected to said field winding and continuously urging current through said field winding in the opposite direction from the normal direction of the current from said controllable unidirectional current means, said residual field bucking circuit including a capacitor, rectifier means for maintaining a charge on said capacitor, and circuit means connecting said capacitor to said field winding, said capacitor having a polarity which is opposed to the polarity which is developed across said field winding by the current from said controllable unidirectional means.

3. Motor-generator voltage apparatus adapted to supply direct current to output connections and to control the voltage of said direct current over a range comprising a motor adapted to be energized from an electrical power source, a generator having field and armature windings, output connections secured to said armature, said armature being driven by said motor, a source of alternating current, controllable unidirectional current means connected to the field winding of the generator, a control circuit connected to the output connections and connected to said controllable unidirectional current means to control the energization of the field winding, and a residual field bucking circuit connected to said field winding and continuously urging current through said field winding in the opposite direction from that of the current from said controllable unidirectional current means, said bucking circuit including a rectifier and a capacitor connected to said alternating current source with said capacitor being charged through said rectifier from said alternating current source, and a resistor connected from said capacitor to said field winding and continuously tending to discharge said capacitor through said field winding.

4. Controllable generator supply apparatus adapted to supply direct current to output connections and to control the voltage on the output connections over a range of values comprising motive means, a generator having separate field and armature windings, output connections secured to said armature, said armature being driven by said motive means, controllable unidirectional current means connected to the field winding of the generator arranged to energize the field, a source of reference voltage, a potentiometer connected to said source and having a movable contact, an amplifier having input and output circuits, a pair of voltage sensing leads, one lead being connected between said movable contact and one of the output connections and the other lead being connected between the other of said output connections and the amplifier input circuits, the amplifier output circuit being connected to said controllable unidirectional current means to control the energization of the field winding, and a residual field bucking circuit connected to said field winding and continuously urging current through said field winding in the opposite direction from that of the current from said controllable unidirectional current means.

5. Motor-generator supply apparatus adapted to supply direct current to output connections and to control the voltage on the output connections over a range of values comprising a motor adapted to be energized from an electrical power source, a generator having field and armature windings, output connections secured to said armature, said armature being driven by said motor, a source of alternating current, controllable unidirectional current means connected between said source and the field winding of the generator to energize the field during alternate half cycles of the alternating current, an inverse rectifier having two terminals, one of said terminals being connected directly to one side of the field winding and the other of said terminals being connected directly to the other side of the field winding, said inverse rectifier being connected directly across said field winding in the inverse direction with respect to said unidirectional current means, a control circuit connected to the output connections and connected to said controllable unidirectional current means to control the energization of the field winding, and a residual field bucking circuit connected to said field winding and continuously urging current through said field winding in the opposite direction from that of the current from said controllable unidirectional current means for partially neutralizing the residual field flux for producing a voltage on said output connections below that which is produced from the residual field flux itself, said bucking circuit applying a continuous direct voltage to said field winding, said continuous voltage having a polarity which is opposed to the polarity of the voltage developed across said field winding by the current from said controllable current means and having a magnitude which is below that causing reverse conduction through said field winding during periods when the output voltage is high.

6. Motor-generator supply apparatus adapted to supply direct current to output connections and to control the voltage on the output connections over a range of values comprising a motor adapted to be energized from an electrical power source, a generator having field and armature windings, output connections secured to said armature, said armature being driven by said motor, a source of alternating current, controllable unidirectional current means connected between said source and the field winding of the generator to energize the field during alternate half cycles of the alternating current, an inverse rectifier connected across said field winding in the inverse direction with respect to said unidirectional current means, a control circuit connected to the output connections and connected to said controllable unidirectional current means to control the energization of the field winding, and a residual field bucking circuit connected to said field winding in the opposite direction from that of the current from said controllable unidirectional current means, said bucking circuit including a capacitor and a second rectifier connected to said alternating current source to charge said capacitor and a resistor connected from said capacitor to said field winding.

7. Motor-generator supply apparatus as claimed in claim 6 and wherein said controllable unidirectional current means is a controllable thyratron having a control electrode, said thyratron being connected in circuit in series with said field winding across said alternating current source, and said second rectifier is connected in circuit in series with said condenser across said alternating current source and said resistor is connected from a point intermediate said second rectifier and condenser to a point intermediate said thyratron and field winding, and said control circuit is connected to the control electrode of said thyratron.

8. Motor-generator supply apparatus adapted to supply direct current to output connections and to control the voltage of said direct current over a range of values comprising a motor adapted to be energized from an electrical power source, a generator having field and armature windings, output connections secured to said armature, said armature being driven by said motor, a source of alternating current, a controllable thyratron connected to the field winding and connected to the alternating current source to energize the field winding therefrom, a control circuit connected to the output connections and connected to said controllable thyratron to control the energization of the field winding, and a residual field bucking circuit connected to said field winding and urging current through said field winding in the opposite direction from that of the current from said controllable unidirectional current means, said bucking circuit including a source of direct current and circuit means connecting said source of direct current across said field winding with a polarity continuously opposed to the polarity of the voltage applied to the field winding by the current from said thyratron, said source of direct current reducing the effective residual field flux of the generator and maintaining said thyratron in conduction during brief periods each cycle of the alternating current regardless of the magnitude of the output voltage in said range.

9. Controllable generator supply apparatus adapted to supply direct current to output connections and to control the voltage on said output connections over a range of values comprising motive means, a generator having field and armature windings, output connections secured to said armature, said armature being driven by said motive means, a source of alternating current, a controllable thyratron connected to energize the field winding of the generator from said alternating current source, a variable source of reference voltage which is variable over a range corresponding with the desired output voltage range, a control circuit connected to oppose the output voltage against said reference voltage and to amplify any difference therebetween and connected to said controllable thyratron to control the energization of the field winding, an inverse rectifier connected across said field winding, and a residual field bucking circuit including a capacitor and a rectifier coupled to said A.C. source to charge said capacitor, and a resistor connected from said field winding to said capacitor in a direction such that the voltage of said capacitor urges current through said field winding in the opposite direction from the current from said thyratron to reduce the residual field flux at low output voltages.

10. Controllable supply apparatus as claimed in claim 9 wherein the voltage on said capacitor is below that required to send current through said inverse rectifier and said bucking circuit causes said thyratron to fire during each cycle of the A.C. even for the lowest output voltages.

11. Motor-generator supply apparatus adapted to provide direct current and to control the voltage of said direct current over a range in response to a control signal voltage comprising an alternating current source, a motor adapted to be energized from said A.C. source, a generator having separate field and armature windings, a pair of output connections secured to said armature, said armature being driven by said motor, and energizing said output connections with predetermined polarity, a controllable half-wave rectifier connected to said A.C. source and to the field winding of the generator to control the energization of the field winding from said A.C. source, an inverse rectifier across said field winding, said inverse rectifier having two terminals, one of said terminals being connected directly to one side of the field winding and the other terminal being connected directly to the other side of the field winding, an amplifier having its output connected to said controllable half-wave rectifier, and a source of control signal voltage of predetermined polarity effectively connected between one of said output connections and the input to the amplifier and opposed to the voltage on the output connection, whereby the difference between the control signal voltage and the voltage on the output connections is applied to the amplifier input.

References Cited in the file of this patent

UNITED STATES PATENTS

| | | |
|---|---|---|
| 2,476,911 | Reilly et al. | July 19, 1949 |
| 2,504,878 | Reilly et al. | Apr. 18, 1950 |
| 2,545,989 | Burgwin | Mar. 20, 1951 |
| 2,717,352 | Ribner | Sept. 6, 1955 |